United States Patent [19]

Opheij et al.

[11] Patent Number: 4,940,890
[45] Date of Patent: Jul. 10, 1990

[54] OPTICAL SCANNING DEVICE, MIRROR OBJECTIVE SUITABLE FOR USE IN SAID DEVICE AND OPTICAL WRITE AND/OR READ APPARATUS PROVIDED WITH SAID DEVICE

[75] Inventors: Willem G. Opheij; Josephus J. M. Braat, both of Eindhoven, Netherlands

[73] Assignee: U.S. Philips Corporation, New York, N.Y.

[21] Appl. No.: 449,294

[22] Filed: Dec. 5, 1989

Related U.S. Application Data

[63] Continuation of Ser. No. 326,587, Mar. 21, 1989, abandoned.

[30] Foreign Application Priority Data

Dec. 13, 1988 [NL] Netherlands ................... 8803055

[51] Int. Cl.$^5$ .............................................. H01J 3/14
[52] U.S. Cl. .................................... 250/216; 350/443; 350/162.21
[58] Field of Search .......................... 250/216, 201; 369/44–46, 112; 350/162.11, 162.21, 162.23, 442–444, 446

[56] References Cited

U.S. PATENT DOCUMENTS

| | | | |
|---|---|---|---|
| 3,825,322 | 7/1974 | Mast | 350/444 |
| 4,554,448 | 11/1985 | Sillitto | 350/442 |
| 4,835,378 | 5/1989 | Coops | 369/45 |
| 4,835,380 | 5/1989 | Opheij et al. | 350/446 |

Primary Examiner—David C. Nelms
Assistant Examiner—Khaled Shami
Attorney, Agent, or Firm—Algy Tamoshunas; Leroy Eason

[57] ABSTRACT

An optical scanning device which includes a radiation source, a mirror objective an a radiation-sensitive detection system, the mirror objective being a transparent body having a radiation window and a reflector symmetrical therewith on each of two opposed surfaces of such body. First diffraction elements are respectively arranged on the first and second radiation window and the second reflector, whereby radiation directed through the first window is focussed to a scanning spot on an information plane and radiation from such plane after a second passage through the mirror objective includes a number of diffracted beams directed on the radiation detection system. The diffracted beams enable detection of tracking errors and focussing errors of the scanning spot relative to tracks on the information plane.

15 Claims, 7 Drawing Sheets

OPTICAL SCANNING DEVICE, MIRROR OBJECTIVE SUITABLE FOR USE IN SAID DEVICE AND OPTICAL WRITE AND/OR READ APPARATUS PROVIDED WITH SAID DEVICE

BACKGROUND OF THE INVENTION

1. Field of the Invention

The invention relates to a scanning device for optically scanning an object, which device comprises a radiation source supplying a scanning beam, a mirror objective for focusing the scanning beam to a scanning spot on such object and a radiation-sensitive detection system for receiving radiation from the object as it is scanned. The invention also relates to a mirror objective suitable for use in such a scanning device and to an optical write and/or read apparatus which includes such a device.

The object to be scanned may be the information plane of an optical record carrier. This information plane may have prerecorded information which is read by the scanning device. It is alternatively possible to write the information plane with a scanning beam which is intensity modulated in accordance with the information to be written. The object may alternatively be an arbitrarily selected object whose structure must be examined, for example by means of a scanning microscope of which the scanning device forms part.

2. Description of the Related Art

A scanning device as described in the opening paragraph, intended for reading an optical record carrier, is known from British Patent Specification No. 1,541,596. This Specification describes an optical scanning device which includes an objective comprising two mirrors whose reflective sides face each other. The one mirror is concave and its reflective side faces the record carrier. The other mirror, which is much smaller, is convex and its reflective side faces the radiation source. The radiation from the radiation source reaches the convex mirror via a passage in the larger concave mirror. The radiation is subsequently reflected towards the concave mirror and focused by this mirror to a radiation spot in the information plane of the record carrier.

The known objective forms part of a two-stage focusing system in which the entire mirror system is suspended in a magnetic coil by which the position of the objective with respect to the record carrier is controlled. The small mirror is mounted on a piece of piezoelectric material and can be moved up and down with the aid thereof so that a small extent of defocus is periodically produced in the information plane, which defocus is detected by a detection device and from which subsequently a focus-error signal is derived which is used for readjusting the position of the objective by means of the magnetic coil.

By using two separate mirrors in a close working relationship with each other, the known scanning device has a rather complicated structure and is sensitive to mechanical perturbations.

SUMMARY OF THE INVENTION

It is an object of the present invention to provide a scanning device which is not only compact and robust but in which the mirror objective is also provided with extra optical elements which give the radiation beam a suitable shape so as to fulfil a plurality of functions required for a correct scanning operation.

To this end the scanning device according to the invention is characterized in that the mirror objective comprises a radiation-transparent body having a first surface facing the radiation source and a second surface remote from the radiation source, such first surface having a first radiation window which is located symmetrically around the optical axis of the mirror objective and having a first reflector surrounding said window, the second surface having a second reflector which is located symmetrically around the optical axis and a second radiation window surrounding said detector. The first radiation window supports a first diffraction element for forming a scanning beam and two auxiliary beams from the radiation beam supplied by the radiation source. The second reflector supports a second diffraction element for diffracting a part of radiation reflected by the object to be scanned and again passing through the mirror objective towards the radiation-sensitive detection system, the diffracted scanning beam being formed in such a way that a focus-error signal can be derived therefrom by means of the detection system.

Such scanning device is compact and robust, not only because the radiation path within the mirror objective is folded, and because this objective consists of one body, but also because the mirror objective in corporated optical elements which, in the devices hitherto known, were separate elements and had to be mounted separately.

The auxiliary beams formed by the first diffraction element are focused by the mirror objective to form two auxiliary spots which are located on the two different edges of a scanned track in the information plane. Each such auxiliary spot is reflected and re-imaged on a separate detector of the detection system. A tracking-error signal, i.e. a signal giving an indication about the magnitude and the direction of a deviation between the centre of the scanning spot and the centre line of the scanned track, can be derived from the difference between the output signals of the said two detectors.

The second diffraction element diffracts part of the radiation reflected by the scanned object and which again passes through the mirror objective towards the detection system, and forms an astigmatic beam or two sub-beams from this radiation. In conjunction with an adapted detection system, a focus-error signal can be derived from the astigmatic beam or the two sub-beams. The focus-error signal is a signal giving an indication about the magnitude and the direction of a deviation between the focusing plane of the mirror objective and the plane to be scanned.

It is to be noted that the use of a diffraction grating in an optical scanning device for forming two auxiliary beams in addition to a scanning beam for generating a tracking-error signal is known per se from U.S. Pat. No. 3,876,842. However, the known device does not employ a second diffraction element for separating the projected and the reflected beams and for generating a focus-error signal. Moreover, the known device does not comprise a mirror objective accommodating the first grating.

It is also known, inter alia from U.S. Pat. No. 4,665,310, to use a diffraction grating in an optical scanning device for separating the projected and the reflected beam and for splitting the last-mentioned beam into two sub-beams for generating a focus-error signal. However, in the scanning device according to U.S. Pat. No. 4,665,310, no additional diffraction element is used for obtaining two auxiliary beams for generating a tracking-error signal.

It is important to note that in the present invention the provision of the two diffraction elements on the two surfaces of the mirror objective, which objective must have a given thickness because of the desired imaging function, ensures that the beams originating from the second diffraction element and directed towards the radiation-sensitive detection system are not split up into further sub-beams by the first diffraction element. Consequently, the number of radiation spots formed on the detection system remains limited so that the geometry of this system can remain relatively simple. Moreover, the energy of the respective radiation spots is still sufficient for generating the different signals.

The diffraction elements may have an amplitude structure, for example in the form of light-transparent or reflective areas alternating with light-absorbing areas. However, a preferred embodiment of the scanning device is characterized in that the diffraction elements have a phase structure.

Such a phase structure comprising for example higher situated areas alternating with lower areas on a surface, has in principle a higher diffraction efficiency than an amplitude structure.

Since the diffraction elements are provided on the surfaces of the mirror objective, the said phase structures can be provided in a relatively simple manner by means of known pressing and replica this techniques.

Different focus-error detection methods can be used in the scanning device according to the invention. A first possibility is that the second diffraction element is an element introducing astigmatism and the radiation-sensitive detection system comprises four detectors which are arranged in four different quadrants around the chief ray of the diffracted scanning beam.

The diffraction element converts the diffracted scanning beam into an astigmatic beam, and the shape of the re-imaged radiation spot is determined by the degree do which the scanning beam is focussed on the information plane.

In the case of defocus the radiation spot will be deformed into an elliptical spot whose major axis, dependent on the defocusing direction, is located in one of two mutually perpendicular directions, hereinafter referred to as astigmatic directions. The separating strips within the four-quadrant detector extend at angles of approximately 45° to the astigmatic directions.

The shape of the radiation spot can be established by determining the sum of the output signals of each pair of diagonally located detectors and by subtracting these two sum signals from each other.

The element introducing astigmatism may be a linear grating which introduces a given extent of astigmatism due to the fact that it is arranged in a non-parallel beam. A larger extent of astigmatism is realised in an embodiment which is characterized in that the element introducing astigmatism is a grating having straight grating strips and a linearly varying grating period. A preferred embodiment of the device is characterized in that the diffraction element is a so-called holographic grating having curved grating strips and a non-linearly varying grating period. Such a holographic grating provides the possibility of correcting for aberrations of the optical system.

It is to be noted that the use of a grating having a linearly varying grating period in combination with a four-quadrant detector for generating a focus-error signal is known per se from U.S. Pat. No. 4,358,200. However, the device according to this Patent does not comprise a second diffraction grating for forming two auxiliary beams.

A second possibility of focus-error detection which is preferred over the above-mentioned so-called astigmatic method as far as temperature sensitivity and ease of control is concerned, is realised in an embodiment which is characterized in that the second diffraction element is a diffraction grating comprising two sub-gratings which split the diffracted scanning beam into two sub-beams, and in that the composite detection system comprises two detector pairs, the first and second sub-beams respectively co-operating with a first and a second of such detector pairs.

In this device the reflected scanning spot is re-imaged into two radiation spots respectively on the respective detector pairs. Each radiation spot shifts transversely of the separating strip between the detectors of the associated detector pair in dependence upon a focusing error of the scanning beam relative to the information plane. This shift can be detected by comparing the output signals of the detectors. This focus-error detection method is known as the double Foucault method.

A preferred embodiment of the last-mentioned device is characterized in that the sub-gratings have a varying grating period and the grating strips thereof are curved.

Due to the varying grating period and the curved grating strips the composite grating has a lens action, and by displacing this grating in the direction between the bounding line of the sub-gratings the energy distribution of the radiation spots can be rendered symmetrical relative to the associated detector pairs, inter alia because the imaging distance of the assembly of objective system and the grating is adapted to the distance, in the direction of the optical axis, between the diode laser and the detectors. This is particularly important if the detectors, in the form of photodiodes, and the diode laser are combined as a single component in which they are fixed relative to each other. A composite grating having varying grating periods and curved grating strips, which grating is also referred to as hologram, provides the possibility of correcting imaging errors such as coma and astigmatism which may occur when using a grating having straight grating strips.

In principle, there are two embodiments of a scanning device in which the Foucault focus-error detection method is used. The first embodiment is characterized in that the grating strips of one sub-grating have the same main direction as those of the other sub-grating, the average grating periods of the sub-gratings are different, and the detector pairs are juxtaposed in a direction parallel to the bounding line between the sub-gratings. In this embodiment the sub-beams of the scanning beam are diffracted in the same direction but at different angles.

The second embodiment is characterized in that the sub-gratings have the same average grating period, the main directions of the grating strips of the one sub-grating extend at a first angle and those of the other sub-grating extend at a second angle to the bounding line between the two sub-gratings, and the detector pairs are juxtaposed in a direction transversely of the direction of the said bounding line. Now the sub-beams of the scanning beam will be diffracted at the same angles but in different directions. This embodiment is preferred to the previous embodiment due to its better assembly tolerances, adjusting facilities and stability.

A preferred embodiment of the scanning device in which the mirror objective is well corrected for spherical aberrations and which can still be manufactured satisfactorily, is characterized in that the second radiation window has an aspherical surface.

An aspherical surface in a lens system is understood to mean a lens element surface whose fundamental shape is spherical but which deviates therefrom to a small extent in order to correct for spherical aberration which would be produced by spherical surfaces. The spherical fundamental shape may have an infinitely large radius of curvature, in which case the aspherical surface has a flat fundamental shape. The advantage of rendering a radiation window aspherical is that the necessary accuracy of the shape of the aspherical surface may be considerably smaller, for example by a factor of 6, than the accuracy which would be required if the surface were spherical.

The use of a mirror objective in a scanning device may result in further advantages with regard to the positioning of the radiation source and the detection system.

For example, an embodiment of the scanning device is further characterized in that the radiation source is connected to the first radiation window. The radiation source is, for example a semiconductor laser whose radiation-emitting surface is arranged against the first radiation window. The radiation source may also be connected to this radiation window via an optical fibre.

A further embodiment of the scanning device is characterized in that the radiation-sensitive detection system is connected to the first radiation window.

The radiation source, the optical fibre or the radiation-sensitive detection system may be secured to the first radiation window by means of, for example a transparent adhesive. This results in a single compact and robust, integrated component accommodating the entire optical section of the scanning device.

The scanning device may comprise different types of radiation sources such as a single diode laser, a diode laser array or another radiation source which can be connected to the mirror objective directly or by means of optical fibres.

BRIEF DESCRIPTION OF THE DRAWINGS

Embodiments of the invention will now be described in greater detail with reference to the accompanying drawings in which FIG. 6 shows a first embodiment of a composite detection system associated with the grating of FIG. 2, FIGS. 7 and 8 show a second and a third embodiment of a composite detection system associated with the grating of FIG. 2.

DESCRIPTION OF THE PREFERRED EMBODIMENTS

Figure 1:
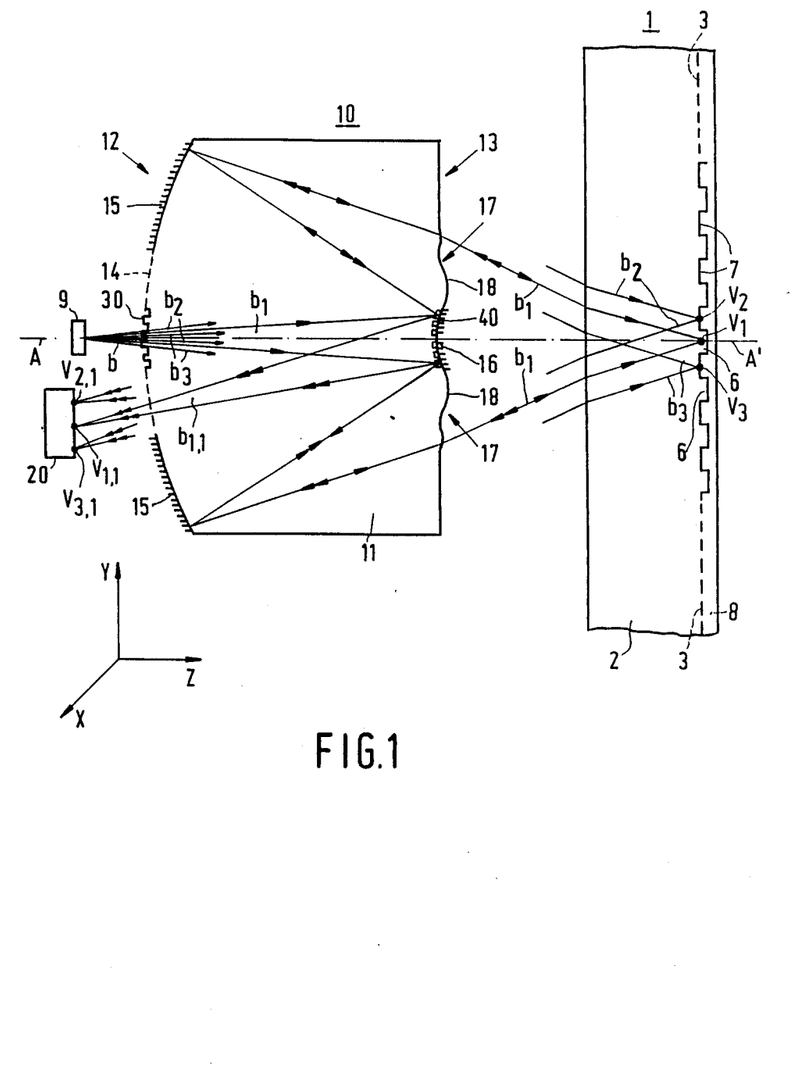
FIG. 1 shows diagrammatically an embodiment of the scanning device according to the invention.

FIG. 1 shows a part of, for example a round disc-shaped record carrier 1 in a tangential cross-section. This record carrier has a transparent substrate 2 and a radiation-reflecting information surface 3. Information tracks only one of which is shown in FIG. 1 have been provided in this surface. If the record carrier has been written with digital information, each track comprises a plurality of information areas 6 which, viewed in the track direction, alternate with intermediate areas 7, the information being signified by the sequence of information areas and intermediate areas. As is shown in FIG. 1 the information structure may be a phase structure. However, it is alternatively possible for the information structure to be an amplitude structure. The information structure may be coated with a protective layer 8.

The information plane is scanned by means of a scanning beam $b_1$ which is supplied by a radiation source 9, for example a diode laser. This beam is focused by an objective system 10 to a scanning spot $V_1$ in the information plane. When rotating the record carrier about an axis perpendicular to this record carrier and parallel to the optical axis AA' and parallel to the direction Z of the system of coordinates XYZ, the spot $V_1$ scans one track. The entire information plane can be scanned by moving the scanning spot and the record carrier in the radial direction relative to each other.

The objective system is a mirror objective and comprises a radiation-transparent body 11 having a first surface 12 on the side thereof nearest the radiation source and a second surface 13 on the side thereof nearest the record carrier. The first surface comprises a first radiation window 14 located symmetrically around the optical axis. This window is surrounded by a reflecting portion 15. The second surface 13 comprises a second reflecting portion 16 located symmetrically around the optical axis and a radiation window 17 surrounding such reflector.

The scanning beam $b_1$ enters the mirror objective 10 via the first window 14 and is subsequently reflected by the second reflector 16 so that the scanning beam, which is already diverging, is rendered even more diverging. Consequently this beam covers substantially the entire surface of the first reflector 15, which reflects the beam as a converging beam and focuses it into the scanning spot $V_1$ on the information plane 3 via the second window 17 and the transparent substrate 2.

The radiation reflected by the information plane and received by the objective system traverses the mirror objective in the reverse direction and is focused into a radiation spot $V_{1,1}$ which would be located at the exit plane of the radiation source 9 if no further measures were taken. As will be explained hereinafter, the reflected beam $b_1'$ is separated from the projected beam $b_{1,1}$. A radiation-sensitive detection system 20 is arranged in the path of the beam $b_{1,1}$. During reading an inscribed record carrier, the reflected scanning beam $b_{1,1}$ is intensity-modulated in accordance with the information which has been read and the radiation-sensitive detection system converts the intensity modulation into an electric signal on which further processing operations can be performed.

The beam focused by the mirror objective 10 exhibits spherical aberration. As is known, inter alia from U.S. Pat. No. 4,668,056, it is possible to correct for this aberration by using aspherical surfaces. It is obvious to give the reflecting surface 15 an aspherical shape, so as to obtain a relatively large diffraction-limited image field. However, according to the invention the surface of one or of both radiation windows 14 and 17 is also aspherical. Though the image field is then reduced, it has been found that it is still sufficiently large for the envisaged object: scanning a surface by means of a diffraction-limited spot. The great advantage of rendering a radiation window aspherical is that the requirements which must be imposed on the accuracy of the shape of the asphere are considerably less stringent than such requirements for a reflecting surface. For an aspherical surface used in transmission the shape tolerances are a factor of $$\frac{n_1 - n_2}{2n_1}$$

larger than those for an aspherical surface used in reflection. In this case $n_1$ is the refractive index of the lens material and $n_2$ is the refractive index of the surrounding medium.

One or both radiation windows 14 and 16 of the mirror objective can be given an aspherical by employing the technique described in U.S. Pat. No. 4,668,056 for giving the surface of a conventional lens an aspherical shape. A mirror objective is then obtained in which the aspherical surface of a radiation window is constituted by the aspherical outer surface of a transparent synthetic material layer which is provided on the spherical surface of this window. The synthetic material may be a polymerisable synthetic material, for example a material being cured under the influence of ultraviolet radiation which is provided in a liquid state on the window and is given the desired shape by means of a mould.

In the embodiment according to FIG. 1 the larger window 17 has an aspherical surface 18. This embodiment is preferred to a second embodiment in which the smaller window 14 is aspherical because the diffraction-limited image field in the first embodiment is larger than in the second embodiment.

When scanning a surface it must be ensured that the scanning beam is always sharply focused on this surface. To this end the scanning device must comprise means for detecting a deviation between the focusing plane of the objective and the surface to be scanned. The signal supplied by these detection means, the focus-error signal, can then be used to correct the focusing, for example by displacing the mirror objective and the surface to be scanned relative to each other along the optical axis. Furthermore, the radiation originating from the surface and received by the objective must be separated from the radiation originating from the radiation source. Finally, it must be ensured, notably when scanning an information surface with information tracks, that the centre of the scanning spot always coincides with the centre line of the scanned track. To this end the scanning device must comprise means for detecting a deviation between the centre of the scanning spot and the centre line of the track, or means for generating a tracking error signal. The position of the scanning spot relative to the track-centre line can then be corrected by means of this signal, for example by displacing the information plane and the optical read unit comprising the radiation source 9, the mirror objective 10 and the detection system 20 relative to one another in the radial direction, the X direction in FIG. 1.

To perform the said functions the mirror objective according to the invention comprises a first radiation-transparent grating 30 which is arranged on the first radiation window 14 and a second reflecting grating 40 which is arranged on the second reflector 16. In this case the fact is utilized that the mirror objective has a given thickness so that the two diffraction elements are present at a mutual distance which is larger than a minimum desired distance, while moreover the first diffraction element 30 is located close to the radiation source and may therefore have small dimensions.

The diffraction element 40, for example a diffraction grating is used in a known described, for example in U.S. Pat. No. 4,665,310 for realising the desired beam separation and for giving the reflected beam a shape which renders it suitable for generating a focus-error signal. This grating splits the scanning beam reflected by the information plane 3 and passing through the objective system 10 into a non-diffracted zero order sub-beam and a plurality of first and higher order sub-beams. One of these beams, preferably a first-order sub-beam, is incident on the radiation-sensitive detection system 20 and is used for generating, inter alia a focus-error signal. The grating parameters, notably the ratio between the width of the grating strips and those of the intermediate grating strips and the depth and the shape of the grating grooves can be chosen to be such that a maximum amount of radiation reaches the detection system.

Figure 2:
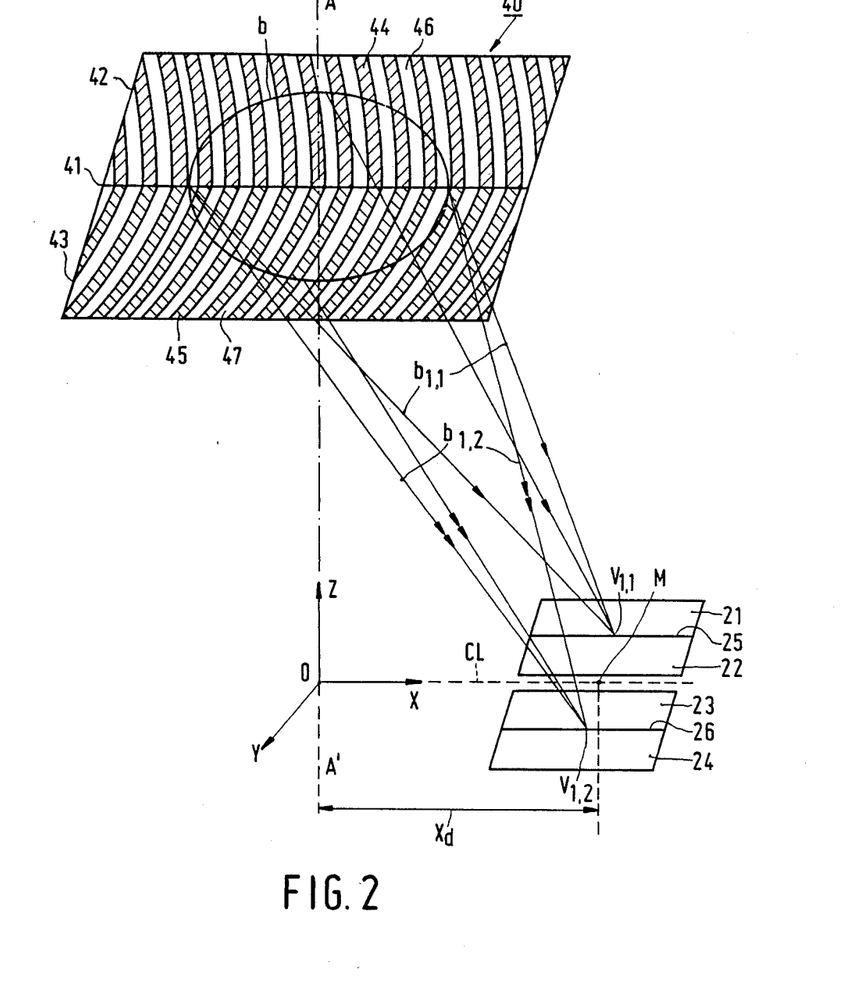
FIG. 2 is a perspective diagrammatical view of a first embodiment of a diffraction grating and the associated composite detection system for generating a focus-error signal.

FIG. 2 shows in a perspective elevational view a known radiation-sensitive detection system 20 and the associated grating 40. The beam $b_1$ is shown by way of its cross-section at the area of the grating 40. This grating 40 comprises two sub-gratings 42 and 43 which are separated from each other by the line 41. The grating strips of the sub-gratings are denoted by the reference numerals 44 and 45, respectively. These grating strips are separated by intermediate strips 46 and 47. In this embodiment the sub-gratings have the same grating periods, but the main directions of the preferably curved grating strips 44 of the sub-grating 42 extend at a first angle to the bounding line 41, while the main directions of the curved grating strips 45 of the second sub-grating 43 extend at a second, preferably equally large but opposite angle to the bounding line. The sub-beams are substantially diffracted in a direction transversely of the main directions. Since the main directions are different, the sub-beams $b_{1,1}$ and $b_{1,2}$ are diffracted at different angles in the YZ plane. This means that in the plane of the detectors, the XY plane, the radiation spots $V_{1,1}$ and $V_{1,2}$ are displaced relative to each other in the Y direction. In this Figure and in the other Figures the references X, Y and Z are the axes of a system of coordinates whose origin 0 coincides with the centre of the radiation-emitting surface of the diode laser 9.

Figure 3A:
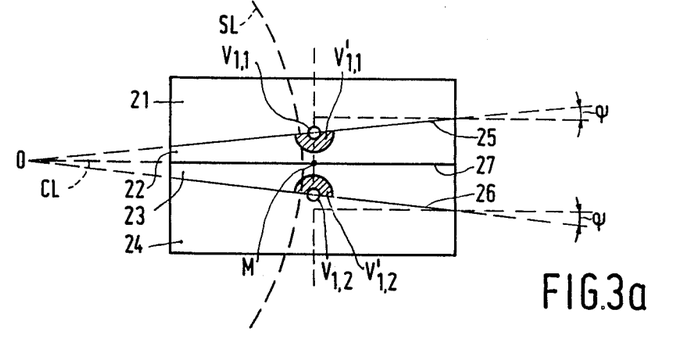
FIGS. 3a and 3b show the variations of the radiation spots on this detection system when focusing errors occur.
Figure 3B:
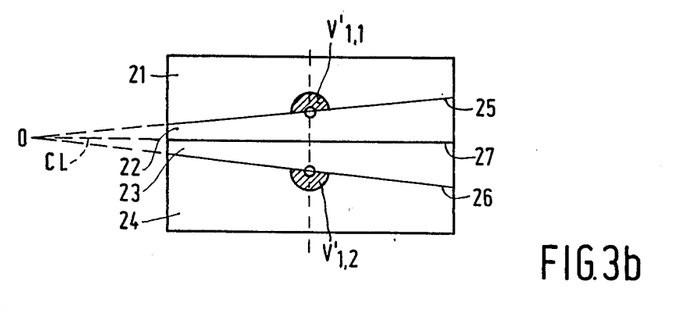

Radiation-sensitive detectors in the form of photodiodes 21, 22 and 23, 24, which are separated by narrow strips 25 and 26, are associated with each of the sub-beams $b_{1,1}$ and $b_{1,2}$, respectively. These detectors are positioned in such a way that in the case of a correct focusing of the beam $b_1$ on the information plane 3 the intensity distribution of the radiation spots $V_{1,1}$ and $V_{1,2}$ formed by the sub-beams $b_{1,1}$ and $b_{1,2}$ is symmetrical relative to the detectors 21, 22 and 23, 24, respectively. When a focusing error occurs, the radiation spots $V_{1,1}$ and $V_{1,2}$ will become asymmetrically larger, as is shown in FIGS. 3a and 3b. This Figure shows a known composite detector whose separating strips 25 and 26 extend at an angle $+\Psi$ and $-\Psi$, respectively to the connection line CL between the point 0 and the centre M of the composite detector 20, which connection line coincides with the separating strip 27 between the detector pairs 20, 22 and 23, 24 in FIGS. 2 and 3. In FIG. 3a the focus of the beam b is situated in a plane in front of the information plane 3, while FIG. 3b shows the focus of the beam b situated in a plane behind the information plane.

If the output signals of the detectors 21, 22, 23 and 24 are represented by $S_{21}$, $S_{22}$, $S_{23}$ and $S_{24}$, respectively, the focus-error signal $S_f$ will be given by:

$$S_f = (S_{21} + S_{24}) - (S_{22} + S_{23}).$$

A signal which is proportional to the information being read, or the information signal $S_i$ is given by:

$$S_i = S_{21} + S_{22} + S_{23} + S_{24}.$$

The grating 30 of FIG. 1 is used for generating a tracking-error signal. As is shown in this Figure, this grating splits a beam b from the source 9 into a non-diffracted zero order beam $b_1$, a beam $b_2$ diffracted in the $+1$ order, a beam $b_3$ diffracted in the $-1$ order and into a plurality of diffracted higher order beams. The last-mentioned beams are not important for the present invention because they are largely diffracted outside the objective system 10 and only have a low intensity. The grating 30 is a single, i.e. undivided, grating having straight grating lines, and, for example a constant grating period. The parameters of this grating, notably the ratio between the width of the grating strips and those of the intermediate grating strips and the depth and the shape of the grating grooves may be chosen to be such that substantially all radiation of the incident beam b reaches the beams $b_1$, $b_2$ and $b_3$. Moreover, it can be ensured that the intensity of the beam $b_1$ is several times larger, for example, 6 times larger than that of each beam $b_2$ and $b_3$.

The beam $b_1$ is the main beam or scanning beam and forms the scanning spot $V_1$ in the information plane 3. The beams $b_2$ and $b_3$ are auxiliary beams which are focused by the objective system 10 in two auxiliary spots $V_2$ and $V_3$ in the information plane. Since the auxiliary beams $V_2$ and $V_3$ are diffracted at opposite angles by the grating 30, the auxiliary spots $V_2$ and $V_3$, viewed in the track direction, are located on either side of the scanning spot $V_1$.

Figure 4A:
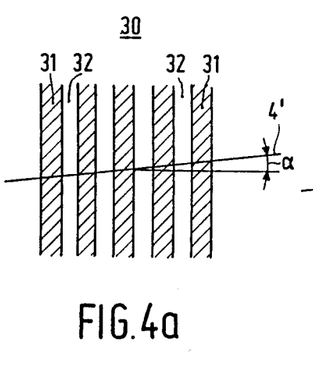
FIGS. 4a and 4b are plan views of the grating for forming the auxiliary beams and a portion of the track structure, respectively.
Figure 4B:
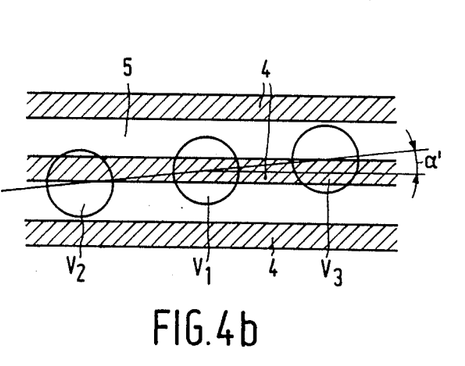

The angle between the direction of the grating strips of the grating 30 and the effective track direction is $90-\alpha$, in which $\alpha$ is small, as is shown in FIG. 4a. This Figure shows a portion of the grating 10 with grating strips 31 and intermediate strips 32 in a plan view. The line 4' is the projection, in the plane of the grating 30, of the centre line of the scanned track. This line represents the effective track direction. By suitable choice of the angle $\alpha$ it is achieved that, if the centre of the scanning spot $V_1$ is located on the centre line of the scanned track, the centre of the auxiliary spot $V_2$ is located on one edge of this track and the centre of the auxiliary spot $V_3$ is located on the other edge of this track, as is shown in FIG. 4b. In the radiation-sensitive detection system 20 a separate detector is available for each auxiliary beam. In the situation shown in FIG. 4b in which the auxiliary spots $V_2$ and $V_3$ cover the track to an equal extent, the output signals of the said detectors are equal. When a tracking error occurs, the centre of one of the auxiliary spots is displaced towards the centre line of the track while the centre of the other auxiliary spot moves away from the centre line and the output signals of the said separate detectors become unequal. The difference between the output signals of the detectors thus represents the tracking-error signal.

The scanning beam and the two auxiliary beams, reflected by the information plane of which only the peripheral rays are shown in FIG. 1, are incident on the grating 40. This grating treats each beam in the same way as has been described with reference to FIG. 2 for the beam $b_1$. Each beam is largely diffracted in the direction of the detection system 20 and is also split into two sub-beams. This split-up, which is effected, for example in the Y direction, is shown separately in FIG. 5 for the sake of clarity. This Figure also shows the grating 40 comprising the two sub-gratings 42 and 43, which grating is rotated through 90° with respect to that in FIG. 2. The cross-sections, at the area of the grating 40, of the reflected scanning beam and two auxiliary beams are denoted by the solid line circle $b_1$ and the half solid line and half broken line circles $b_2$ and $b_3$, respectively. The grating 40 splits the beam $b_1$, $b_2$, $b_3$ into two sub-beams $b_{1,1}$; $b_{1,2}$, $b_{2,1}$; $b_{2,2}$, and $b_{3,1}$; $b_{3,2}$, respectively. The sub-grating 42 diffracts the sub-beams $b_{1,1}$; $b_{2,1}$ and $b_{3,1}$ to the right which sub-beams are focused in the radiation spots $V_{1,1}$; $V_{2,1}$ and $V_{3,1}$ on the composite detector 20. The sub-grating 43 diffracts the sub-beams $b_{1,2}$; $b_{2,2}$ and $b_{3,2}$ to the left which sub-beams are focused in the radiation spots $V_{1,2}$; $V_{2,2}$ and $V_{3,2}$. The composite detector comprises two detector pairs 21, 22 and 23, 24 for the radiation spots $V_{1,1}$ and $V_{1,2}$, respectively, and one detector 50 for the radiation spots $V_{2,1}$ and $V_{2,2}$ and one detector 51 for the radiation spots $V_{3,1}$ and $V_{3,2}$.

Figures 6, 7:
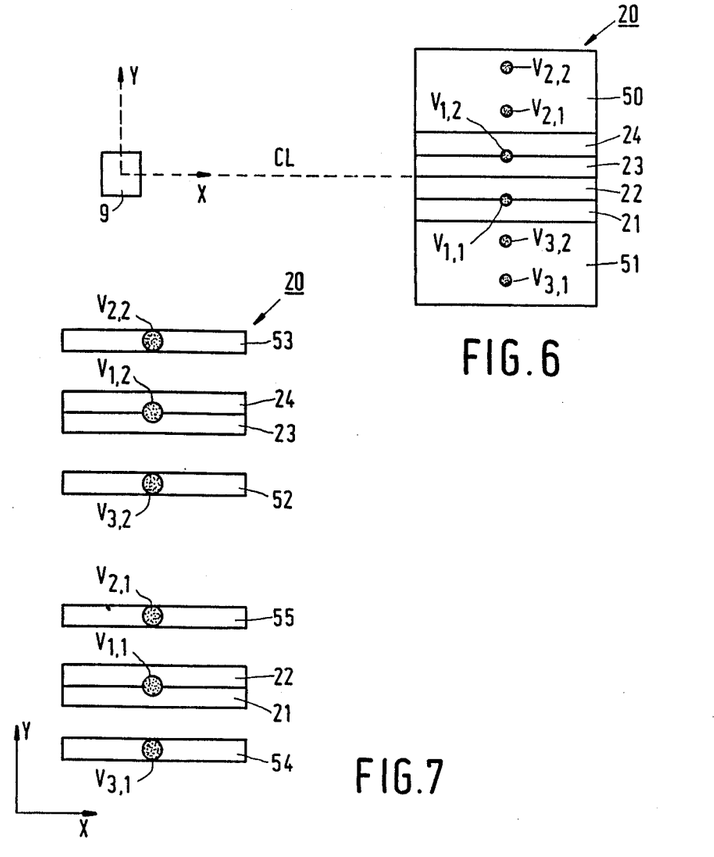

In FIG. 6 the radiation spots formed and the associated detectors are shown again. This Figure also shows how the radiation-emitting surface of the diode laser 9 is located relative to the composite detector. If the output signals of the detectors 50 and 51 are represented by $S_{50}$ and $S_{51}$, respectively, the tracking-error signal $S_r$ will be given by:

$$S_r = S_{50} - S_{51}.$$

The focus-error signal remains:

$$S_f = (S_{21} + S_{24}) - (S_{22} + S_{23})$$

and the information signal $S_i$ is now given by:

$$S_i = S_{21} + S_{22} + S_{23} + S_{24}.$$

A characteristic of the device according to the present invention is that the number of radiation spots on the detectors is limited to the principally minimum number necessary for the required functions. As a result it is achieved that the detection system can be relatively simple and that the intensity of the radiation spots on this system is sufficiently large so that the output signals of the detectors are sufficiently strong.

For the Foucault focus-error detector method the reflected scanning beam ($b_1$) must be split into two auxiliary sub-beams. Since after reflection the auxiliary beams ($b_2$, $b_3$) must also pass through the composite grating 40, three beams are also inevitably each split up into two sub-beams so that a total of six beams is produced. According to the invention special steps are taken to achieve that the number of beams remains limited to this minimum number in spite of the fact that two diffraction gratings are arranged one behind the other in the radiation path.

In principle, the grating (30) could be placed above the first grating (40). Then the three beams $b_1$, $b_2$, $b_3$ formed by the grating 30 would pass through this grating again after reflection by the record carrier and would be further split up into nine beams. These beams would subsequently pass through the grating 40, producing a total number of 18 beams. Such number of beams can be limited by placing the grating 30 below the grating 40, but without further steps the number of beams would still be too large with this positioning. In fact, the beams from the grating 40 could pass through the grating 30 and would be further split up so that more than six beams would be incident on the detection system. This is avoided by arranging the gratings 30 and 40 on the surfaces 12 and 13 of the mirror objective, which objective has a given thickness, and by making the grating 30 small and placing it close to the radiation source. Consequently, the beams originating from the grating 40 and directed towards the detection system 20 can no longer traverse the grating 30.

Steps have also been taken to prevent the laser beam from being split up too much on its projected path from the radiation source to the information plane. As already stated, it is ensured that the grating 30 concentrates the radiation as much as possible in the scanning beam and the two auxiliary beams. The composite grating 40 is formed in such a way that the radiation diffracted in the first and higher orders by this grating on the projected path of these beams reaches the information plane at a relatively large distance from the radiation spot $V_1$. Therefore, the said higher order radiation has a negligible influence on the desired signals after reflection by the information plane and second passage through the grating 40.

The above-mentioned considerations about the device using Foucault focus-error detection of course also apply to a device using astigmatic focus-error detection, on the understanding that the number of radiation spots on the detection system is in principle smaller in the last-mentioned device because the grating 40 is not sub-divided.

Figure 5:
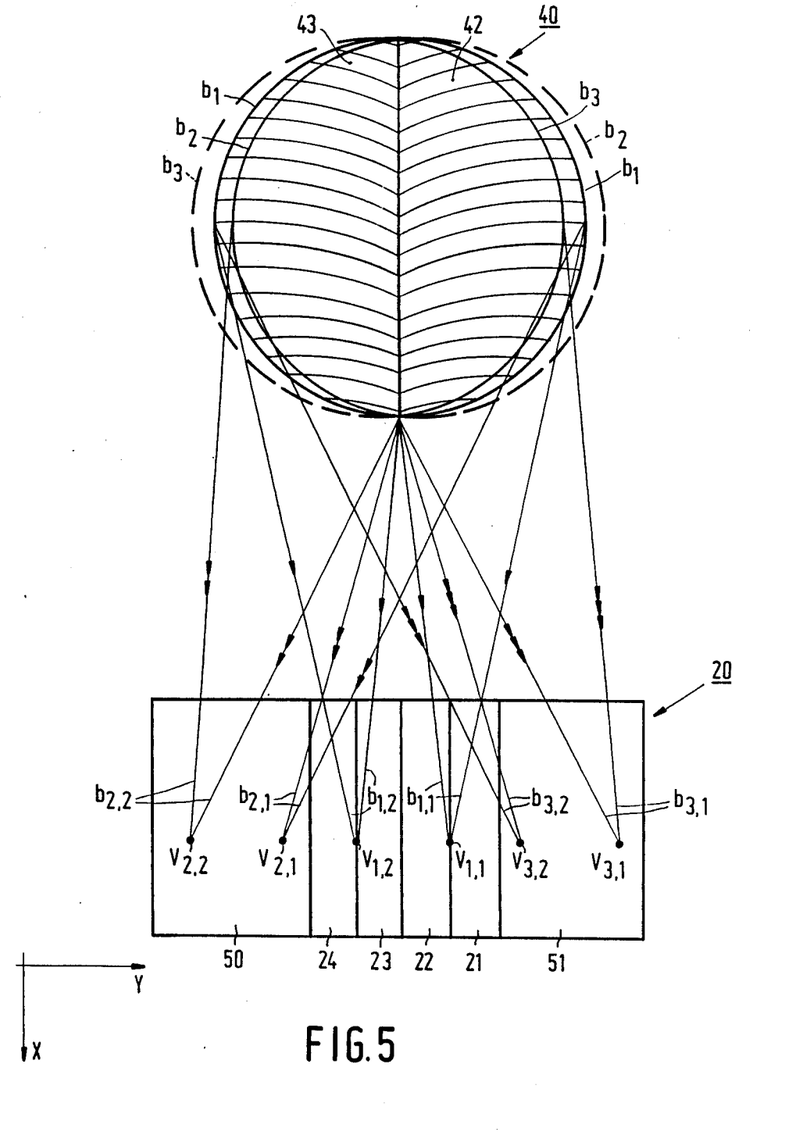
FIG. 5 shows in a schematic form how the scanning beam and the auxiliary beams are diffracted and split by the composite diffraction grating and the positions of the radiation spots formed on the composite detector.

In the embodiment illustrated in FIGS. 5 and 6 the "Foucault radiation spots" $V_{1,1}$ and $V_{1,2}$ are located between the auxiliary spots $V_{2,1}$ and $V_{2,2}$ on the one hand and the auxiliary spots $V_{3,1}$ and $V_{3,2}$ on the other hand. This has the advantage that only one detector is required for each pair of auxiliary spots, but the choice of the angle between the sub-beams $b_{1,1}$ and $b_{1,2}$ and hence the angle between the grating strips 44 and 45 is limited. FIG. 7 shows the geometry of the composite direction system of an embodiment which provides a greater freedom of choice as far as this aspect is concerned. In this embodiment the separation, in the plane of the detection system 20, realised by the grating 40 is larger than the separation realised by the grating 30.

Consequently, the radiation spots $V_{1,2}$ and $V_{1,1}$ are located at a larger distance from each other than the radiation spots $V_{1,2}$ and $V_{2,2}$ and $V_{3,2}$, respectively or the radiation spots $V_{1,1}$ and $V_{2,1}$ and $V_{3,1}$, respectively. Separate detectors should be available for each of the radiation spots $V_{2,2}$ and $V_{2,1}$ and the radiation spots $V_{3,2}$ and $V_{3,1}$, respectively.

Figure 8:
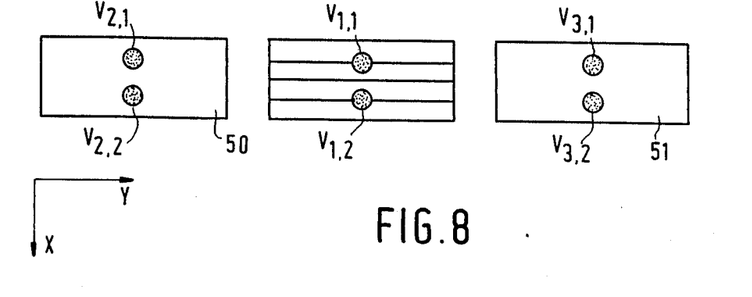

An embodiment in which only one detector is required for the radiation spots $V_{2,2}$ and $V_{2,1}$ and the radiation spots $V_{3,2}$ and $V_{3,1}$, which is still sufficient freedom of choice for the angle between the sub-beams $b_{1,1}$ and $b_{1,2}$, can be achieved if beam splitting by the grating 30 is realised in a different direction than that realised by the grating 40. This embodiment corresponds to that shown in FIG. 1 in combination with FIG. 2. FIG. 8 shows the detector geometry of this embodiment and does not need any further explanation.

Figure 9:
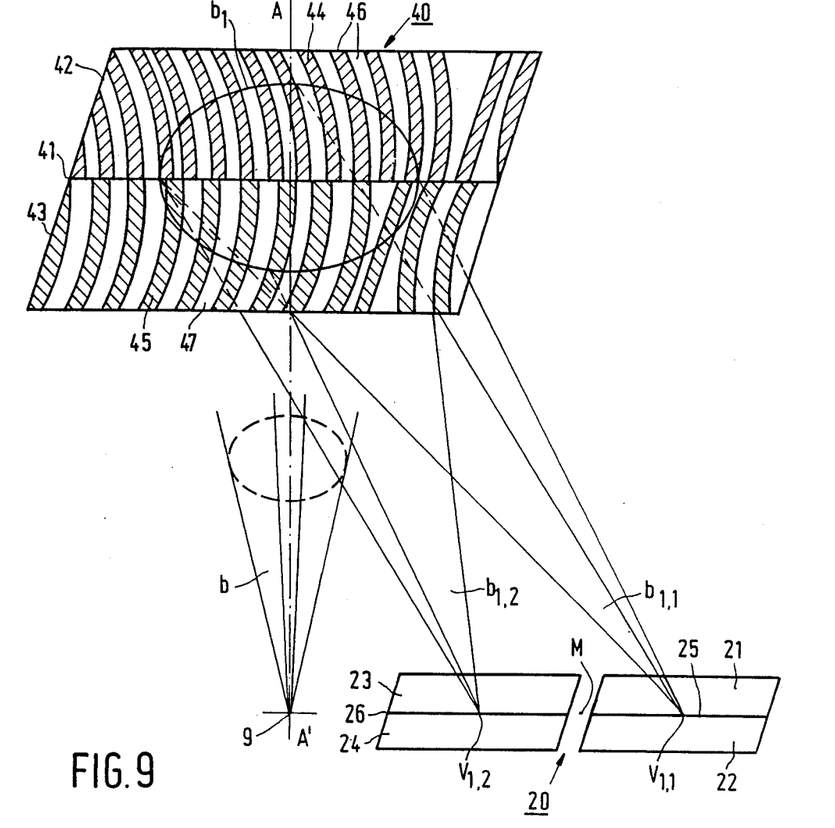
FIG. 9 shows a second embodiment of a diffraction grating for generating a focus-error signal.

Not only a composite composite grating of FIG. 2 but also the grating 40 as shown in FIG. 9 can be used for generating a focus-error signal. This Figure only shows the scanning beam $b_1$ by way of its cross-section in the plane of the grating with its sub-beams $b_{1,1}$ and $b_{1,2}$. The main directions of the preferably curved grating strips of the two sub-gratings 42 and 43 now extend at the same angle to the bounding line 41, while the average grating periods of the two sub-gratings are different. Consequently, the angle at which the sub-beam $b_{1,2}$ is diffracted is different from the angle at which the sub-beam $b_{1,1}$ is diffracted. This means that in the plane of the detectors 21, 22, 23 and 24 the radiation spots $V_{1,1}$ and $V_{1,2}$ are displaced relative to each other in the direction of the bounding line 41.

Figure 10:
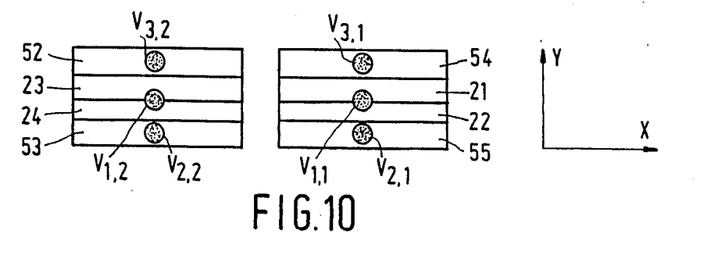
FIG. 10 shows an embodiment of the detection system associated with this grating.

According to the invention the grating 40 shown in FIG. 9 can also be combined with the grating (30 in FIG. 1) for forming two auxiliary beams. If the diffraction by the last-mentioned grating is realised in the Y direction, while the diffraction by the grating according to FIG. 9 is realised in the X direction, the detection system will have a geometry as is shown in FIG. 10.

For the grating 40 not only the grating periods but also the main directions of the preferably curved grating strips of the two sub-gratings 42 and 43 may be different. The operation of such grating may be considered to be a combination of that of the gratings of FIGS. 2 and 9. Consequently, the sub-beam $b_{1,1}$ is diffracted in two mutually perpendicular directions through a different angle than the sub-beam $b_{1,2}$. In the plane of the composite detector 20 the radiation spots $V_{1,1}$ and $V_{1,2}$ are displaced relative to each other in two mutually perpendicular directions.

It is to be noted that the composite diffraction grating shown in FIG. 2 is preferred to that shown in FIG. 9, due to its better manufacturing tolerances, adjusting facilities and stability.

The sub-gratings 42 and 43 may have straight grating strips and a constant grating period. However, preferably a type of grating, also referred to as holograms, is used which has a varying grating period, the variation in the period being, for example of the order of several percents of the average grating period. Moreover, the grating strips of the two sub-gratings are curved, as is shown in FIGS. 2 and 9. Thus, these sub-gratings have a variable lens action. Due to the varying grating period the positions of the radiation spots $V_{1,1}$ and $V_{1,2}$ can be varied by displacing the grating 40 in its own plane. Aberrations in a direction perpendicular to the direction of the bounding line 41 can be minimized by the curvatures of the grating strips. The possibility of moving the positions of the radiation spots is particularly important if an integrated laser-photodiode unit is used, i.e. a component in which the diode laser and the photodetectors are arranged on one support and are therefore fixed relative to each other and thus have a fixed mutual distance in the Z direction. This distance is subject to manufacturing tolerances and cannot be corrected during assembly of the device by displacing the photodiodes relative to the laser diode in the Z direction.

In the embodiment according to FIG. 9 it can be ensured that in spite of the different angles at which the sub-beams, inter alia $b_{1,1}$ and $b_{1,2}$ are diffracted due to the different average grating periods of the sub-gratings 12 and 43, the foci of the sub-beams are located in one plane parallel to the plane of the composite detection system, namely by giving the grating periods and the curvatures of the grating strips of corresponding portions of the sub-gratings a different variation.

An important advantage of the diffraction grating having curved grating strips as compared with a grating having straight grating strips is that the optical aberrations such as coma and astigmatism, which may occur when using the last-mentioned grating, can be avoided in the first-mentioned grating by taking these aberrations into account when manufacturing this grating and by adapting the curvatures of the grating strips accordingly.

Figures 11, 12:
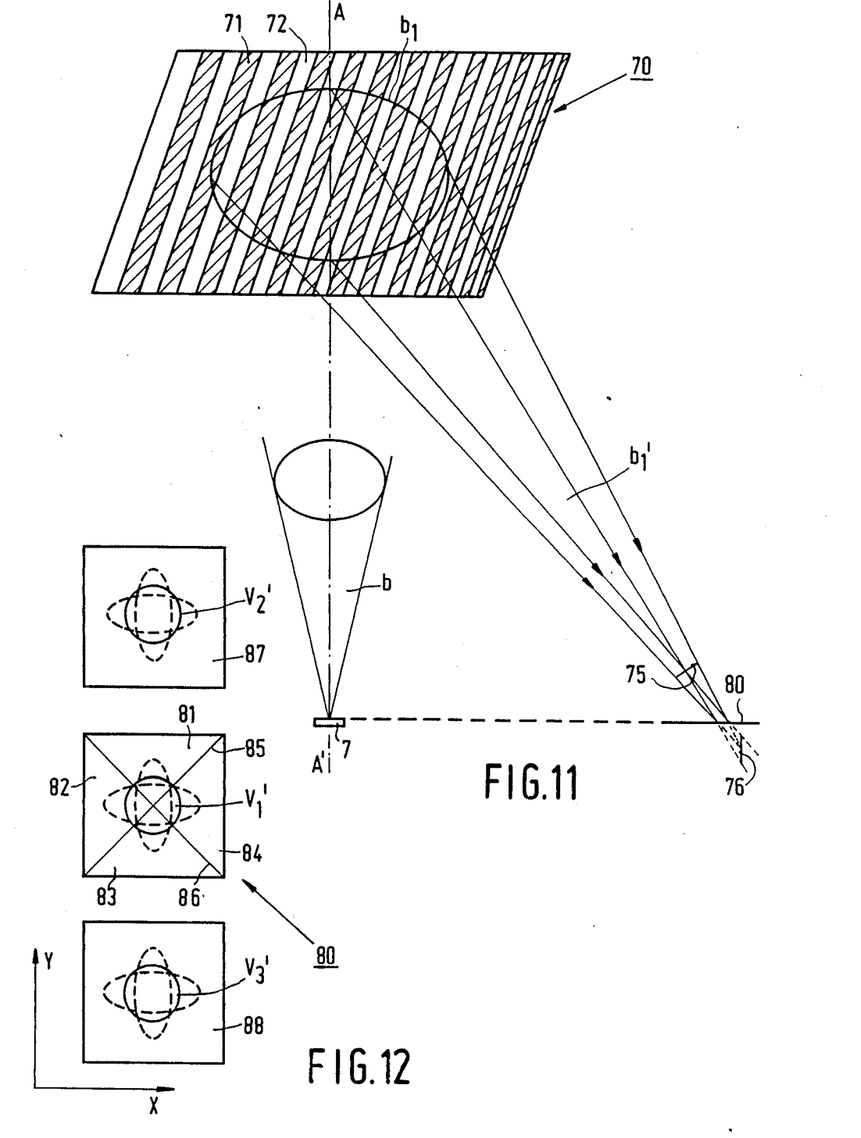
FIG. 11 shows a first embodiment of an astigmatic grating for generating a focus-error signal and FIG. 12 shows the composite detection system associated with this grating.

FIG. 11 shows a grating 70 for converting the reflected scanning beam $b_1$ into an astigmatic beam $b_1'$. This grating has straight grating strips 71 and a linearly varying grating period. The grating is dimensioned in such a way that the radiation of the beam $b_1$ is largely diffracted in one order, for example the +1 order. The first order beam $b'_1$ is no longer focused in one point but in two mutually perpendicular focal lines 75 and 76, the line 75 being located in a position where the beam $b'_1$ would be focused if the grating were not astigmatic. When a focusing error occurs, the focal lines 75 and 76 are simultaneously displaced in the same direction and over the same distance. A so-called four-quadrant detector 80 is arranged in a plane approximately halfway between the positions occupied by the astigmatic focal lines, if the scanning beam is sharply focused on the information plane. This detector, shown in FIG. 12, comprises four detectors 81, 82, 83 and 84 which are arranged in four different quadrants around the chief ray of the diffracted beam $b'_1$. If the scanning beam is sharply focused on the information plane 3, the radiation spot $V'_1$ formed by the beam $b'_1$ in the plane of the detectors is round, as is illustrated by the solid line circle in FIG. 12. If a focusing error occurs, the radiation spot $V'_1$ is deformed to an elliptical spot as is illustrated by the broken line ellipses in FIG. 12. The major axis of the ellipse extends at an angle of 45° to the separating strips 85 and 86, the sign of the angle being determined by the sign of the focusing error. If the signals of the detectors 81, 82, 83 and 84 are represented by $S_{81}$, $S_{82}$, $S_{83}$ and $S_{84}$, the focus-error signal $S_f$ will be given by:

$$S_f = (S_{81} + S_{83}) - (S_{82} + S_{84}).$$

If a second grating (30 in FIG. 1) is arranged in a scanning device with such an astigmatic grating 70 for forming two auxiliary beams $b_2$ and $b_3$, the composite detection system will have the geometry shown in FIG. 12. One undivided detector 87, 88 is provided for each radiation spot $V'_2$ and $V'_3$ formed by the reflected auxiliary beams $b_2$ and $b_3$, respectively. It has been assumed that the grating strips of the grating 30 are substantially transverse to the track direction, thus extend in the X direction, and that the grating strips of the grating 70 extend in the Y direction. It is alternatively possible for the grating strips of both the grating 70 and the grating 30 to be transverse and substantially transverse to the effective track direction.

In the device shown in FIGS. 11 and 12 the separating strips 85 and 86 extend at an angle of 45° to the effective track direction. When a tracking error occurs, the centre of gravity of the intensity distribution of the radiation spot $S_1'$ is displaced to the left or the right in the X direction. As a result, a tracking error may influence the focus-error signal.

This can be prevented by positioning, for example, the astigmatic grating 70 in such a way that the astigmatic focal lines of the scanning beam $b_1'$ passing through this grating are rotated through 45° relative to these lines in FIG. 11. The separating strips 85 and 86 of the four-quadrant detector can then be rotated through 45° relative to these separating strips in FIG. 12 and hence may be parallel and perpendicular, respectively, to the track direction. A tracking error results in the amount of radiation on the detectors 81 and 84 increasing or decreasing relative to the amount of radiation on the detectors 82 and 83. Since the signals from the detectors 81 and 84 as well as those from the detectors 82 and 83 are subtracted from each other for determining the focusing error, a tracking error does not have any influence on the focus-error signal.

The invention has been described for use in a read apparatus, but it may alternatively be used in a write apparatus or in a combined write-read apparatus in which during recording the focusing and the tracking of the write beam are monitored. The focus-error and tracking-error detection system described do not utilize special properties of the information surface 3. It is merely necessary and adequate that this surface is reflecting and has a track structure. Therefore, the invention may be used in various devices where a very accurate read-out is required, for example in microscopes.

We claim:

1. A scanning device for optically scanning an object, which device comprises a radiation source supplying a scanning beam, a mirror objective for focusing the scanning beam to a scanning spot and a radiation-sensitive detection system for receiving radiation from the object to be scanned, characterized in that the mirror objective comprises a radiation-transparent body having a first surface facing the radiation source and a second surface remote from the radiation source, said first surface having a first radiation window which is located symmetrically around the optical axis of the mirror objective and having a first reflector surrounding said window, said second surface having a second reflector which is located symmetrically around the optical axis and a second radiation window surrounding said second reflector, in that the first radiation window supports a first diffraction element for forming a scanning beam and two auxiliary beams from the radiation beam supplied by the radiation source and in that the second reflector supports a second diffraction element for diffracting a part of radiation reflected by the object to be scanned and again passing through the mirror objective towards the radiation-sensitive detection system and for deforming the diffracted scanning beam in such a way that a focus-error signal can be derived therefrom by means of the detection system.

2. A scanning device as claimed in claim 1, characterized in that at least one of the diffraction elements has a phase structure.

3. A scanning device as claimed in claim 1, characterized in that the second diffraction element is an element introducing astigmatism and in that the radiation-sensitive detection system comprises four detectors which are arranged in four different quadrants around the chief ray of the diffracted scanning beam.

4. A scanning device as claimed in claim 2, characterized in that the second diffraction element is an element introducing astigmatism and in that the radiation-sensitive detection system comprises four detectors which are arranged in four different quadrants around the chief ray of the diffracted scanning beam.

5. A scanning device as claimed in claim 2, characterized in that the second diffraction element is a diffraction grating comprising two sub-gratings for splitting the diffracted beam into two sub-beams and in that the detection system comprises two detector pairs, a first and a second sub-beam co-operating with a first and a second detector pair, respectively.

6. A scanning device as claimed in claim 5, characterized in that the sub-gratings have a varying grating period and in that the grating strips of the sub-gratings are curved.

7. A scanning device as claimed in claim 3 or 4, characterized in that the second diffraction element is a grating having straight grating strips and a linearly varying grating period.

8. A scanning device as claimed in claim 3 or 4, characterized in that the second diffraction element is a holographic grating having curved grating strips and a non-linearly varying grating period.

9. A scanning device as claimed in claim 1, characterized in that the second diffraction element is a diffraction grating comprising two sub-gratings for splitting the diffracted beam into two sub-beams and in that the detection system comprises two detector pairs, a first and a second sub-beam co-operating with a first and a second detector pair, respectively.

10. A scanning device as claimed in claim 9, characterized in that the sub-gratings have a varying grating period and in that the grating strips of the sub-gratings are curved.

11. A scanning device as claimed in any one of claims 9, 10, 5 and 6, characterized in that the grating strips of the one sub-grating have the same main direction as those of the other sub-grating, in that the average grating periods of the two sub-gratings are different and in that the detector pairs are juxtaposed in a direction parallel to the bounding line between the sub-gratings.

12. A scanning device as claimed in any one of claims 9, 10, 5 and 6, characterized in that the sub-gratings have the same average grating period, in that the main directions of the grating strips of the one sub-grating extend at a first angle and those of the other sub-grating extend at a second angle to the bounding line between the two sub-gratings and in that the detector pairs are juxtaposed in a direction transversely of the direction of the said bounding line.

13. A scanning device as claimed in any one of claims 1, 2, 3, 9, 10, 4, 5 and 6, characterized in that the second radiation window has an aspherical surface.

14. A scanning device as claimed in any one of claims 1, 2, 3, 9, 10, 4, 5 and 6, characterized in that the radiation source is connected to the first radiation window.

15. A scanning device as claimed in any one of claims 1, 2, 3, 9, 10, 4, 5 and 6, characterized in that the radiation-sensitive detection system is connected to the first radiation window.

* * * * *